United States Patent [19]
Liu et al.

[11] Patent Number: 4,732,942
[45] Date of Patent: Mar. 22, 1988

[54] HYDROCARBON COMPOSITIONS CONTAINING POLYOLEFIN GRAFT POLYMERS

[75] Inventors: Christopher S. Liu, Poughkeepsie; Benjamin J. Kaufman, Hopewell Junction; Maria M. Kapucinski, Carmel, all of N.Y.

[73] Assignee: Texaco Inc., White Plains, N.Y.

[21] Appl. No.: 902,837

[22] Filed: Sep. 2, 1986

[51] Int. Cl.$^4$ .................. C08F 255/04; C08F 255/06; C08F 255/00
[52] U.S. Cl. .................................... 525/301; 525/304; 524/533; 252/51.5 A; 252/56 R
[58] Field of Search ...................... 525/304, 301, 285

[56] References Cited

U.S. PATENT DOCUMENTS

| | | | |
|---|---|---|---|
| 4,160,739 | 7/1979 | Stambaugh et al. | 525/301 |
| 4,219,432 | 8/1980 | Girgente et al. | 525/285 |
| 4,517,104 | 5/1985 | Bloch et al. | 525/285 |
| 4,557,847 | 12/1985 | Gutierrez et al. | 252/51.5 |

*Primary Examiner*—Carman J. Seccuro
*Attorney, Agent, or Firm*—Robert A. Kulason; James J. O'Loughlin; Carl G. Seutter

[57] ABSTRACT

Lubricating oil compositions of improved dispersancy contain an ethylene-propylene copolymer grafted onto which is acrylic acid dimer, the free carboxyl group of which has thereafter been amidized with diethylene triamine.

24 Claims, No Drawings

HYDROCARBON COMPOSITIONS CONTAINING POLYOLEFIN GRAFT POLYMERS

FIELD OF THE INVENTION

This invention relates to hydrocarbon lubricating oils. More particularly, it relates to hydrocarbon lubricating oils which contain graft polymers which permit attainment of improved properties.

BACKGROUND OF THE INVENTION

As is well known to those skilled in the art, lubricating oils must be formulated, as by addition of various additives, to improve their properties.

In the case of lubricating oils typified by those employed in railway, automotive, aircraft, marine, etc. service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, etc. Illustrative of such prior approaches is U.S. Pat. No. 4,089,794.

It is an object of this invention to provide an additive system which permits attainment of improved lubricating oils. Other objects will be apparent to those skilled in the art.

STATEMENT OF THE INVENTION

In accordance with certain of its aspects, this invention is directed to a linear, substantially oil-soluble polymer having a carbon-carbon backbone bearing a graft moiety derived from, as graft monomer, a carboxy saturated-hydrocarbyl ester of a carboxylic acid containing an ethylenically unsaturated carbon-carbon double bond.

DESCRIPTION OF THE INVENTION THE POLYMER

The charge polymer which may be employed in practice of the process of this invention may include an oil-soluble, substantially linear, carbon-carbon backbone polymer. Typical carbon-carbon backbone polymers prepared from monomers bearing an ethylenically unsaturated polymerizable double bond which may be employed include homopolymers or copolymers prepared from monomer

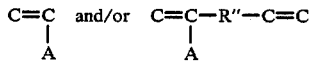

wherein A may be: hydrogen; hydrocarbon such as alkyl, aryl, etc.; RCOO— typified by acetate, or less preferred acyloxy —COOR; halide; etc. R″ may be divalent hydrocarbon typified by alkylene, alkarylene, aralkylene, cycloalkylene, arylene, etc.

Illustrative of such monomers may be acrylates; methacrylates; vinyl halides (such as vinyl chloride); styrene; olefins such as propylene, butylene, etc.; vinyl acetate; dienes such as butadiene, isoprene, hexadiene, ethylidene norbornene, etc. Homopolymers of olefins, (such as polypropylene, polybutylene, etc.), of dienes, (such as hydrogenated polyisoprene), or copolymers of ethylene with e.g. butylene and higher olefins, styrene with isoprene and/or butadiene may be employed. The preferred carbon-carbon backbone polymers include those selected from the group consisting of ethylene-propylene copolymers (EPM or EPR) and ethylene-propylene-third monomer terpolymers (EPDM or EPT).

When the charge polymer is an ethylene-propylene copolymer (EPM, also called EPR polymers), it may be formed by copolymerization of ethylene and propylene under known conditions preferably Ziegler-Natta reaction conditions. The preferred EPM copolymers contain units derived from ethylene in amount of 40–70 mole %, preferably 50–60 mole %, say 55 mole %, the remainder being derived from propylene.

The molecular weight $\overline{M}_n$ of the EPM copolymers which may be employed may be 10,000–1,000,000, preferably 20,000–200,000, say 80,000. The molecular weight distribution may be characterized by a polydispersity index $\overline{M}_w/\overline{M}_n$ of less than about 15, preferably 1.2–10, say 1.6.

Illustrative EPM copolymers which may be employed in practice of the process of this invention may be those set forth in the following table, the first listed being preferred:

TABLE

A. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a polydispersity index of 1.6.

B. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5;

When the charge polymer is a terpolymer of ethylene-propylene-diene (EPT or EPDM), it may be formed by copolymerization of ethylene, propylene, and diene. The diene monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40–70 mole %, preferably 50–65 mole %, say 60 mole % and units derived from propylene in amount of 20–60 mole %, preferably 30–50 mole %, say 32 mole % and units derived from diene third monomer in amount of 0.5–15 mole %, preferably 1–10 mole %, say 2 mole %. The molecular weight $\overline{M}_n$ of the terpolymers may typically be 10,000–1,000,000, preferably 20,000–200,000, say 120,000. Molecular weight distribution of the useful polymers is preferably narrow viz a polydispersity index $\overline{M}_w/\overline{M}_n$ of typically less than 15, preferably 1.5–10, say about 2.2.

Illustrative EPT terpolymers which may be employed in practice of the process of this invention may be those set forth in the following table, the first listed being preferred:

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index of 2.2.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity index of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index of 2.5.

E. The Epsyn 40A brand of EPT marketed by Copolymer Rubber and Chemical Corp. containing 60 mole % of units derived from ethylene, 37 mole % of units derived from propylene, and 3 mole % of units derived from ethylidene norbornene and having a $\overline{M}_n$ of 140,000 and a polydispersity index of 2.

The EPM and EPT polymers may contain minor portions (typically less than about 30%) of other units derived from other copolymerizable monomers.

It is a feature of the process of this invention that there may be grafted onto these oil-soluble, substantially linear carbon-carbon, backbone polymers graft moieties derived from, as graft monomer, a carboxy saturated-hydrocarbyl ester of a carboxylic acid containing an ethylenically unsaturated carbon-carbon double bond.

THE GRAFT MONOMER

The graft monomer which may be employed may be a carboxy saturated-hydrocarbyl ester of a carboxylic acid containing an ethylenically unsaturated carbon-carbon double bond.

Typical acids from which the carboxylic acid portion of this monomer may be derived may include the following, the first listed being preferred:

TABLE
acrylic acid
methacrylic acid

The alcohol portion of the monomer may be characterized as a residue of a carboxy alcohol typified the following, the first listed being preferred:

TABLE
hydroxy acetic acid
beta-hydroxy butyric acid
ethyl hydroxy acetate

The preferred graft monomer may be

R*—COO—R″—COOR wherein R* is a hydrocarbon moiety containing an ethylenically unsaturated carbon-carbon double bond selected from the group consisting of alkenyl, cycloalkenyl, aralkenyl, and alkenaryl, R″ is a divalent hydrocarbon moiety selected from the group consisting of alkylene, alkarylene, aralkylene, and cycloalkylene, and R is hydrogen or a hydrocarbon moiety selected from the group consisting of alkyl, aralkyl, alkaryl, cycloalkyl, and aryl. Preferably R is hydrogen and R″ is —CH₂CH₂— and R* is CH₃CH₂.

The preferred graft monomer may be prepared typically by oligomerization of a monomer which contains a carboxy —COO— group and an ethylenically unsaturated carbon-carbon double bond. Typical of such monomers may be acrylic acid CH₂=CH—COOH. When acrylic acid is oligomerized, preferably dimerized, the product may be characterized by the formula:

These charge graft monomers may alternatively be prepared by reaction of a saturated hydroxy acid (such as hydroxy acetic acid or an ester thereof such as ethyl hydroxy acetate) with an unsaturated acid (such as acrylic acid). It may be possible to react a salt (such as sodium acrylate) with a halide such as beta-chloropropionic acid.

Commercial oligomers (e.g. dimers) may be suitable.

One preferred composition may be the Sipomer B-CEA brand (marketed by the Alcolac Company) of acrylic acid dimer—a viscous liquid oligomer containing 2 repeating units i.e. characterized by the formula:

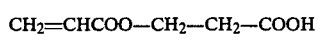

The trimer may be employed:

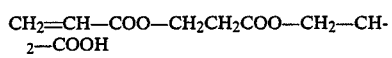

It is a feature of this invention the esters of these oligomers may be employed i.e. esters prepared by esterifying the free carboxyl groups of the oligomer (or less preferably the carboxyl group on the monomer from which the oligomer may be prepared). This will provide an oligomer which may be more readily handleable—typically a liquid, which may be desirable for handling purposes.

Typical of the esters may be the following, the first listed being preferred:

TABLE
CH₂=CH—COO—CH₂—CH₂COOC₂H₅
CH₂=CH—COO—CH₂—CH₂COOCH₃

THE GRAFTING REACTION

In practice of this process of this invention, 100 parts of charge EPM or EPT may be added to 100–1000 parts, say 300 parts of solvent. Typical solvent may be a hydrocarbon solvent such as mineral oil, hexane, or heptane, or tetrahydrofuran. Preferred solvent may be a mineral oil or commercial hexane containing principally hexane isomers. Reaction mixture may then be heated under nitrogen to reaction conditions of 60° C.–180° C., preferably 150° C.–170° C., say 155° C. When n-hexane or other low boiling solvent is used, reaction is carried out in a pressure reactor at 15–300 psig, preferably 180–220 psig, say 200 psig.

In the preferred process, there are admitted to the reaction mixture graft monomer, typically acrylic acid dimer in amount of 1–14 parts, say 5 parts, and a solution in hydrocarbon of free radical initiator. Typical free radical initiators may include dicumyl peroxide, di-t-butyl peroxide, benzoyl peroxide, di-isopropyl peroxide, azobisisobutyronitrile, etc. The solvent is preferably the same as that in which the EPR or EPT is dissolved. The initiator may be added in amount of 0.2–10 parts, say 2 parts in 0.8–40 parts, say 16 parts of solvent.

The reaction is carried out at a temperature at least as high as the decomposition temperature of the initiator, typically 60° C. or higher.

Reaction is typically carried out at 60° C.–180° C., say 155° C. for 0.5–10 hours, say 1 hour during which time graft polymerization of the acrylic acid dimer onto the base EPR or EPT polymer occurs. The typical final product graft polymer may be characterized by the presence of the following typical units.

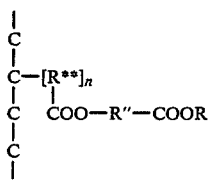

wherein $n \geq 1$, wherein $R^{**}$ is a hydrocarbon moiety derived from $R^*$ by opening up of the double bond during graft polymerization. In the case in which the graft monomer is acrylic acid dimer, the product may be

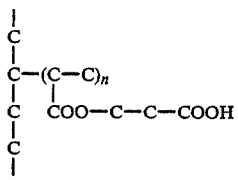

wherein $n \geq 1$.

The product may be characterized by molecular weight $\overline{M}_n$ of 10,000–1,000,000, preferably 20,000–200,000, say 80,000. It may contain 0.3 mole%–20 mole%, preferably 0.5–10 mole %, say 2 mole% derived from the graft monomer per 1,000 carbon atoms of the charge backbone polymer.

A typical product may be that obtained by grafting acrylic acid dimer onto the Epsyn 4006 brand of EPT, to yield product of molecular weight $\overline{M}_n$ of about 120,000 and containing about 2 mole% derived from acrylic acid dimer.

THE FUNCTIONALIZING AMINE

It is a feature of this invention that the graft polymer so prepared may be functionalized by amidization. Amidization may be carried out by reacting the free carboxyl groups with amine.

The amine compositions which may be employed in practice of the process of this invention according to certain of its aspects may include primary or secondary mono- or polyamines. The amines may typically be characterized by formula

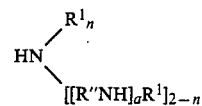

In this formula, a may be a number 1–20, preferably 0–10, say 5; and n may be 0 or 1.

In the above compound, $R^1$ may be hydrogen or a hydrocarbon group selected from the group consisting of alkyl, aralkyl, cycloalkyl, aryl, and alkaryl, including such radicals when inertly substituted. When $R'$ is alkyl, it may typically be methyl, ethyl, n-propyl, iso-propyl, n-butyl, i-butyl, sec-butyl, amyl, octyl, decyl, octadecyl, etc. When $R^1$ is a aralkyl, it may typically be benzyl, beta-phenylethyl, etc. When $R^1$ is cycloalkyl, it may typically be cyclohexyl, cycloheptyl, cyclooctyl, 2-methylcycloheptyl, 3-butylcyclohexyl, 3-methylcyclohexyl, etc. When $R^1$ is aryl, it may typically be phenyl, naphthyl, etc. When $R^1$ is alkaryl, it may typically be tolyl, xylyl, etc. $R^1$ may be inertly substituted i.e. it may bear a non-reactive substituent such as alkyl, aryl, cycloalkyl, ether, etc. Typically inertly substituted $R^1$ groups may include 2-ethoxyethyl, carboethoxymethyl, 4-methyl cyclohexyl, etc. The preferred $R^1$ groups may be hydrogen or lower alkyl, i.e. $C_1$–$C_{10}$ alkyl, groups including eg methyl, ethyl, n-propyl, i-propyl, butyls, amyls, hexyls, octyls, decyls, etc. $R^1$ may preferably be hydrogen.

$R^2$ may be a hydrocarbon selected from the same group as $R^1$ subject to the proviso that $R^2$ is divalent and contains one less hydrogen atom. $R^2$ may be alkylene, alkarylene, aralkylene, cycloalkylene, or arylene. In an alternative embodiment, $R^2$ may together with the nitrogen atoms may form a cycloaliphatic or an aromatic ring typified by piperazine

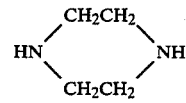

Although it may be possible to utilize mono-amines such as $R^1 NH_2$, it is preferred to utilize polyamines. Typical amines which may be employed may include the following the first two noted being preferred:

TABLE propylenediamine
diethylenetriamine
di-isopropylenetriamine
triethylenetetramine
tetraethylenepentamine
pentaethylenehexamine
piperazine
N-aminomethyl piperazine
N-(beta-aminoethyl)piperazine
N-hydroxy piperazine In one embodiment, $R^1$ may be hydrogen and $R^2$—$CH_2CH_2$—. It is preferred however that the amine be diethylene triamine.

AMIDIZATION

In practice of the process of this invention, functionalization or amidization may be effected under functionalizing conditions in liquid phase, preferably by adding the functionalizing amine to the polymer (typically in 10–30 w%, say 20 w% solution in inert diluent-soluent as recovered from graft polymerization).

The amine may be added to the graft polymer in amount of 0.1–1.5, say about 1 mole per mole of free carboxylic acid groups in the graft polymer.

The reaction mixture, preferably under inert (eg. nitrogen) atmosphere is heated to 80° C.–200° C., say about 140° C. for 1–8 hours, say about 2 hours. At the end of this time, the reaction mixture is cooled.

During the reaction the amine reacts with the —COOH or —COOR groups to form amides. The following may be a typical reaction:

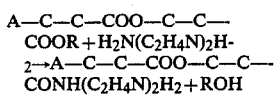

wherein A represents the polymer backbone.

The product so prepared is typically a solution containing 10–80 w%, say 20 w% of functionalized copolymer in inert diluent-solvent. In preferred operation, it may be employed as so prepared with no further work up. For convenience of handling if desired it may be diluted to a concentration of 5–20 w%, say 10 w% by addition of additional diluent-solvent which may be the same as that employed in the reaction—or it may be a lubricating oil cut such as that in which the product may be formulated. Such polymer oil solution is used as lubricant additive, e.g. as VI improver.

LUBRICATING COMPOSITION

It is a feature of this invention that the polymer product so prepared may be added in minor effective portion to a major portion of a lubricating oil; and the lubricating compositions so prepared may be found to possess superior properties The lubricating oils which may be treated by the process of this invention may include oils intended for use in automotive, railroad, marine, aircraft, etc; spark ignition or compression ignition; winter or summer; heavy duty or light duty; etc. The oil may be a hydrocarbon, ester, or silicone, etc. composition.

A typical lubricating oil in which the polymer of this invention may be present, may be a standard SAE 5W-30 hydrocarbon motor oil having the following components:

TABLE

| | | W % |
|---|---|---|
| Solvent Neutral Oil | 100 SUS | 80 |
| Kin. Visc. | | |
| 40° C. (cSt) | 20 | |
| 100° C. (cSt) | 4.0 | |
| Pour Point (°F.) | 0 to +10 | |
| Viscosity Index Improver | | 11 |
| Standard Additive Package | | 9 |
| Polyisobutenyl ($\overline{M}_n$ 1290) succinimide | | |
| (dispersant and anti-wear) | | |
| calcium sulfonate (detergent) | | |
| Zinc dithiophosphate (anti-wear) | | |
| di-nonyl diphenyl amine (anti-oxidant) | | |
| 4,4'-methylene-bis (2,6-di-t-butyl phenol) | | |
| (anti-oxidant) | | |
| polyethoxy phenol (anti-wear) | | |

It is a feature of this invention that the novel polymer may serve as a multifunctional lube oil additive. Generally the additive may be present in amounts ranging from as little as 0.005 w% up to as much as say 15%. Smaller quantities will only give desired improvement to a lesser degree; and larger quantities may not generally be recommended.

When it is to be used as a sole dispersant, it may be present in effective amount of 2–10 w%, say about 10 w%. When it is to be used as sole viscosity index improver, it may be present in effective amount of 2–10 w%, say about 10 w%. When it is to be used as a pour point depressant, it may be present in amount of 0.005–2 w%, say about 0.5 w%.

When it is intended that the additive polymer serve to provide all of these functions, as a supplement to a standard system, the effective amount may be 0.005–15 w%, say about 10 w% based on total lubricating composition. When employed in this manner, it may be used to upgrade prior art viscosity index improver dispersant systems.

The ability of this polymer to serve as a dispersant additive may be measured by the Bench VC Test (BVCT), in which the turbidity of an oil is measured after addition of synthetic blow-by.

When compared to the standards (Excellent, Good, Poor) of the Bench VC Test, lubricating oils containing the additives of this invention consistently show high performance characteristics to a degree surpassing control formulations.

The ability of this polymer to serve as a viscosity index improver may be measured by ASTM Test D-445.

It is found that lubricating compositions containing the product of this invention are characterized by satisfactory (i.e. lowered) Pour Point when tested by ASTM Test D 97-79.

Generally it may be possible, by use of the additives of this invention, to attain improvements in viscosity index, of pour point, and to improve the dispersancy of oils otherwise characterised by undesirable level of dispersancy.

DESCRIPTION OF SPECIFIC EMBODIMENTS

Practice of the process of this invention will be apparent to those skilled in the art from the following wherein, as elsewhere in this specification, all parts are parts by weight unless otherwise noted.

EXAMPLE I

In this example which represents practice of the best made known of carrying out the first step of the process of this invention, the charge polymer is the Epsyn brand of EPM copymer marketed by Copolymer Rubber and Chemical Corporation containing 60 mole % of units derived from ethylene and 40 mole % of units derived from propylene, having a molecular weight $\overline{M}_n$ of 140,000 and a polydispersity index of about 1.6. A 19.6 w% solution of this polymer in 145 PPTS HF (145 Paraffinic Pale Turbine Stock—High Finished) oil is purged with nitrogen and heated to 155° C. in a reaction vessel.

Acrylic acid dimer (m.w. 144) is added, in amount of 4.86 parts per 100 parts by weight of polymer, followed by 1.2 parts of a 50 w % solution of dicumyl peroxide in 145 PPTS-HF oil (corresponding to 1.2 parts of peroxide per 100 parts of polymer). The reaction mixture is stirred at 155° C. for one hour; and solvent neutral oil (SNO-100) is added (1076 parts) to yield a solution which contains 8.5 w % graft polymer.

Results comparable to Example I may be obtained if the charge polymers are as follows:

| Example | Charge Polymer |
|---|---|
| II | The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5. |
| III | The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a polydispersity index of 1.6. |
| IV | The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index of 2.2. |
| IV | The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index of 2. |

Results comparable to those of Example I maybe obtained if the graft monomer, used in place of the acrylic acid dimer (in equal molar amount) is:

TABLE

| Example | Graft Monomer |
|---|---|
| VI | $H_2C=\overset{CH_3}{\underset{|}{C}}-COOCH_2CH_2COOH$ |
| VII | $H_2C=\overset{CH_3}{\underset{|}{C}}-COOCH_2\overset{CH_3}{\underset{|}{C}}HCOOH$ |
| VIII | $H_2C=CH-COOCH_2\overset{CH_3}{\underset{|}{C}}HOOH$ |
| IX | $H_2C=\overset{CH_3}{\underset{|}{C}}-COOCH_2CH_2COOC_2H_5$ |
| X | $H_2C=CHCOOCH_2CH_2COOC_2H_5$ |

EXAMPLE XI

In practice of the best mode presently known of carrying out the second step of the invention, the product prepared in Example I before SNO-100 is added, is amidized by addition thereto of parts 0.03 moles of diethylene triamine (corresponding to 2.75 parts per 100 parts of polymer i.e. 1 mole per mole of free carboxylic acid). Reaction mixture is maintained at 140° C. for 2 hours and then after dilution to 8.5 w% with SNO-100 and cooling utilized directly in the lubricating oil testing.

EXAMPLE XII

The solution prepared in Example IV is amidized by the procedure set forth in Example XI.

Results comparable to Example XI may be obtained if the amine (used in place of diethylene triamine, in equimolar amounts), is:

| EXAMPLE | AMINE |
|---|---|
| XIII | $NH_2(CH_2CH_2NH)_2CH_2CH_2NH_2$ |
| XIV | $NH_2(CH_2CH_2NH)_3CH_2CH_2NH_2$ |
| XV | $NH_2CH_2CH_2N\overset{\frown}{\underset{\smile}{\phantom{XX}}}NH$ |
| XVI | $CH_3N\overset{\frown}{\underset{\smile}{\phantom{XX}}}NH$ |
| XVII | $NH_2CH_2CH_2N\overset{\frown}{\underset{\smile}{\phantom{XX}}}NCH_2CH_2OH$ |

EXAMPLE XVIII*

In this control example, the charge polymer of Example I is made up into a 20 w% solution in 145 PPTS HF oil and no graft polymerization or functionalization is employed.

EXAMPLE XIX*

In this control example, the charge polymer of Example IV is made up into a 20 w% solution in 145 PPTS HF oil and no graft polymerization or functionalization is employed.

EXAMPLE XX*

In this control example, the charge polymer of Example I is grafted with acrylic acid dimer and functionalized with benzotriazole.

EXAMPLE XXI*

In this control Example, the charge polymer of Example IV is grafted with acrylic acid dimer and functionalized with benzotriazole.

EXAMPLE XXII*

In this control example, the charge polymer of Example I is grafted with acrylic acid dimer and functionalized with morpholine.

EXAMPLE XXIII*

In this control example, the charge polymer of Example IV is grafted with acrylic acid dimer and functionalized with morpholine.

The products of Example XI-XII and XVIII-XXIII are subjected to the Bench VC Test (BVCT). In this test, the ability of an additive to serve as a dispersant is determined by measuring the turbidity of an oil after addition of synthetic blow-by. The oil is rated against three standards: one of which is characterized by excellent dispersancy, and another by good dispersancy, and another by poor dispersancy. Rating is on a scale of 0–100. Low ratings at or below that received by the oil of fair dispersancy are indicative that the additive is a candidate for use as a dispersancy additive.

In this test, each additive is added (10 w%) to a low cost SE lubricating oil base blend having the following composition:

TABLE

| Component | W % |
|---|---|
| SNO-7 oil | 75.25 |
| SNO-20 oil | 21.64 |
| Zinc dithiophosphate (anti-wear) | 1.22 |
| Naugalube 438 brand of di-nonyl-di-phenyl amine (antioxidant) | 0.39 |
| Surchem 521 brand of magnesium sulfonate (detergent) | 1.50 |
| Silicone polymer (anti-foamant) | 150 ppm |

This base blend has the following properties:

TABLE

| Property | Value |
|---|---|
| Kinematic Viscosity cSt | |
| 40° C. | 30.04 |
| 100° C. | 5.33 |
| Pour Point °F. | +10 |
| Ash (Sulfated) % (by ASTM D-874) | 0.88 |
| Phosphorus % X-ray | 0.12 |
| Sulfur % X-ray total | 0.32 |
| Zinc % X-ray | 0.12 |
| Magnesium % | 0.15 |
| Cold Cranking Simulator cP @ −18° C. | 1400 |

The results of these tests are as follows:

TABLE

| Example | Product of Example | BVCT Rating | Standards |
|---|---|---|---|
| XXIV* | XVIII* | 99.3 | 9.0/36.5/66.4 |
| XXV* | XIX* | 99.3 | 9.0/36.5/66.4 |
| XXVI | XI | 31.8 | 16.7/39.2/65.4 |
| XXVII | XII | 31.8 | 16.7/39.2/65.4 |
| XXVIII* | XX* | 78.8 | 16.7/39.2/65.4 |
| XXIX* | XXI* | 78.8 | 16.7/39.2/65.4 |
| XXX* | XXII* | 97.4 | 16.7/39.2/65.4 |
| XXXI* | XXIII* | 97.4 | 16.7/39.2/65.4 |

From the above Table, the following conclusions may be noted:

(i) EPM or EPT polymers showed ratings on the BVCT which were worse than the worst of the three standards and this is unsatisfactory from the point of view of dispersancy, (see Examples XXIV* and XXV*;

(ii) The products of this invention (Examples XXVI and XXVII) showed a BVCT dispersancy rating sufficiently low to indicate that these products are good enough to be included as possible candidates for further study;

(iii) The graft products which had been functionalized with benzotriazole showed a BVCT dispersancy rating so high that they are believed to be unsatisfactory as possible dispersants in lubricating oil systems (Examples XXVIII* and XXIX*);

(iv) The graft polymers which had been functionalized with morpholine (Examples XXX*–XXXI*) were even worse than those which had been functionalized with benzotriazole as measured by the BVCT for dispersancy.

Although this invention has been illustrated by reference to specific embodiments, it will be apparent to those skilled in the art that various changes and modifications may be made which clearly fall within the scope of this invention.

What is claimed:

1. A linear, substantially oil-soluble polymer having a carbon-carbon backbone bearing a graft moiety derived from, as graft monomer, a carboxy saturated-hydrocarbyl ester of a carboxylic acid containing an ethylenically unsaturated carbon-carbon double bond.

2. A linear, substantially oil-soluble polymer as claimed in claim 1 wherein said graft monomer is:

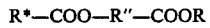

R*—COO—R"—COOR wherein R* is a hydrocarbon moiety containing an ethylenically unsaturated carbon-carbon double bond selected from the group consisting of alkenyl, cycloalkenyl, aralkenyl, and alkenaryl, R" is a divalent hydrocarbon moiety selected from the group consisting of alkylene, alkarylene, aralkylene, and cycloalkylene, and R is hydrogen or a hydrocarbon moiety selected from the group consisting of alkyl, aralkyl, alkaryl, cycloalkyl, and aryl.

3. A linear, substantially oil-soluble polymer as claimed in claim 1 wherein said graft monomer is R*—COO—R"—COOH and R* is a hydrocarbon moiety containing an ethylenically unsaturated carbon-carbon double bond selected from the group consisting of alkenyl, cycloalkenyl, aralkenyl, and alkenaryl, and R" is a divalent hydrocarbon moiety selected from the group consisting of alkylene, alkarylene, aralkylene, cycloalkylene and arylene.

4. A linear, substantially oil-soluble polymer as claimed in claim 2 wherein in said graft monomer, R* and R" contain the same number of carbon atoms.

5. A linear, substantially oil-soluble polymer as claimed in claim 1 wherein said graft monomer is acrylic acid dimer.

6. A linear, substantially oil-soluble polymer having a carbon-carbon backbone onto which has been grafted, as graft monomer, a carboxy saturated-hydrocarbyl ester of a carboxylic acid containing an ethylenically unsaturated carbon-carbon double bond, the free carboxyl group of which, after grafting, has been amidized, by reaction with amine.

7. A linear, substantially oil-soluble polymer having a carbon-carbon backbone as claimed in claim 6 wherein said graft monomer is

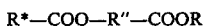

R*—COO—R"—COOR wherein R* is a hydrocarbon moiety containing an ethylenically unsaturated carbon-carbon double bond selected from the group consisting of alkenyl, cycloalkenyl, aralkenyl, and alkenaryl, R" is a divalent hydrocarbon moiety selected from the group consisting of alkylene, alkarylene, aralkylene, and cycloalkylene, and R is hydrogen or or hydrocarbon moiety selected from the group consisting of alkyl, aralkyl, alkaryl, alkaryl, aryl, and cycloalkyl.

8. A linear, substantially oil-soluble polymer having a carbon-carbon backbone as claimed in claim 7 wherein said graft monomer is R*—COO—R"—COOH.

9. A linear, substantially oil-soluble polymer having a carbon-carbon backbone as claimed in claim 7 wherein, in said graft monomer R* and R''' contain the same number of carbon atoms.

10. A linear, substantially oil-soluble polymer having a carbon-carbon backbone as claimed in claim 6 wherein said graft monomer is acrylic acid dimer.

11. A linear, substantially oil-soluble polymer having a carbon-carbon backbone as claimed in claim 6 wherein said amine is

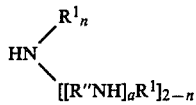

wherein
R$^1$ is hydrogen or an alkyl, alkaryl, aralkyl, cycloalkyl, or aryl hydrocarbon group;
R'' is an alkylene, alkarylene, aralkylene, cycloalkylene, or arylene hydrocarbon group;
n is 0 or 1
and a is 1–20.

12. A linear, substantially oil-soluble polymer having a carbon-carbon backbone as claimed in claim 6 wherein said amine is $H_2N[CH_2CH_2NH]_aH$ wherein a is 1–20.

13. A linear, substantially oil-soluble polymer having a carbon-carbon backbone as claimed in claim 6 wherein said amine is $H_2N[CH_2CH_2NH]_2H$.

14. The method of preparing a polymer composition containing a carbon-carbon backbone which comprises
introducing a polymer containing a carbon-carbon backbone into a reaction mixture;
introducing into said reaction mixture, as graft monomer, a carboxy saturated-hydrocarbyl ester of a carboxylic acid containing an ethylenically unsaturated carbon-carbon double bond;
maintaining said reaction mixture at graft polymerization reaction conditions in the presence of free-radical graft polymerization catalyst thereby forming graft polymer including a linear polymer having a carbon-carbon backbone bearing, as graft moiety, a carboxy saturated-hydrocarbon (carboxy hydrocarbyl) group; and
recovering said linear polymer having a carbon-carbon backbone bearing, as graft moiety, a carboxy saturated-hydrocarbon (carboxy hydrocarbyl) group.

15. The method of preparing a polymer composition containing a carbon-carbon backbone which comprises
introducing a polymer containing a carbon-carbon backbone into a reaction mixture;
introducing into said reaction mixture, as graft monomer, a carboxy saturated-hydrocarbyl ester of a carboxylic acid containing an ethylenically unsaturated carbon-carbon double bond;
maintaining said reaction mixture at graft polymerization reaction conditions in the presence of free-radical graft polymerization catalyst thereby forming graft polymer including a linear polymer having a carbon-carbon backbone bearing, as graft moiety, a carboxy saturated-hydrocarbon (carboxy hydrocarbyl) group; and
reacting said linear polymer having a carbon-carbon backbone bearing, as graft moiety, a carboxy saturated-hydrocarbon (carboxy hydrocarbyl) group with an amine thereby forming a graft polymer composition containing a carbon-carbon backbone and bearing, as graft moiety, a carboxy saturated-hydrocarbon (carboxy hydrocarbyl) group which has been amidized after grafting; and recovering said graft polymer.

16. A concentrate containing an inert diluent-solvent and a linear, substantially oil-soluble polymer having a carbon-carbon backbone bearing, a graft moiety derived from, as graft monomer, a carboxy saturated-hydrocarbyl ester of a carboxylic acid containing an ethylenically unsaturated carbon-carbon double bond which has been amidized after grafting.

17. A lubricating oil composition comprising a major portion of a lubricating oil and a minor effective amount of a linear, substantially oil-soluble polymer having a carbon-carbon backbone bearing, a graft moiety derived from as graft monomer, a carboxy saturated hydrocarbyl ester of a carboxylic acid containing an ethylenically unsaturated carbon-carbon double bond.

18. A lubricating oil composition comprising a major portion of a lubricating oil and a minor effective portion of a linear, substantially oil-soluble polymer having a carbon-carbon backbone onto which has been grafted, as graft monomer, a carboxy saturated-hydrocarbyl ester of a carboxylic acid containing an ethylenically unsaturated carbon-carbon double bond, the free carboxyl group of which has been amidized after grafting.

19. A lubricating oil composition as claimed in claim 18 wherein said graft monomer is

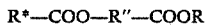

wherein R* is a hydrocarbon moiety containing an ethylenically unsaturated carbon-carbon double bond selected from the group consisting of alkenyl, cycloalkenyl, aralkenyl, and alkenaryl, R'' is a divalent hydrocarbon moiety selected from the group consisting of alkylene, alkarylene, aralkylene, cycloalkylene, and R is hydrogen or a hydrocarbon moiety selected from the group consisting of alkyl, aralkyl, alkaryl, cycloalkyl, and aryl.

20. A lubricating oil composition as claimed in claim 19 wherein said graft monomer is

21. A lubricating oil composition as claimed in claim 19 wherein in said graft monomer, R* and R'' contain the same number of carbon atoms.

22. A lubricating oil composition as claimed in claim 18 wherein said graft monomer is acrylic acid dimer.

23. A lubricating oil composition as claimed in claim 18 wherein said minor effective portion is 0.5–1.5 w%.

24. A lubricating oil composition comprising a major portion of a lubricating oil and a minor effective portion of a copolymer of ethylene-propylene or of ethylene-propylene-third monomer onto which has been grafted acrylic acid dimer, the free carboxyl group of which has, after grafting, been amidized by reaction with diethylene tetramine.

* * * * *

UNITED STATES PATENT AND TRADEMARK OFFICE
CERTIFICATE OF CORRECTION

PATENT NO. : 4,732,942

DATED : March 22, 1988

INVENTOR(S) : C. S. Liu, B. J. Kaufman, M. M. Kapucinski

It is certified that error appears in the above-identified patent and that said Letters Patent is hereby corrected as shown below:

Column 4, line 7, cancel "$CH_3CH_2$", insert -- $CH_2=CH-$ --;

Column 6, lines 31, 32, 33, and 35, cancel "$R^2$", insert -- R" --;

Column 6, line 62, cancel "$R^2$", and insert -- R" is --;

Column 8, line 48, cancel "made", insert -- mode --;

Column 14, line 20, cancel "a", insert -- as --.

Signed and Sealed this

Eleventh Day of December, 1990

*Attest:*

HARRY F. MANBECK, JR.

*Attesting Officer*   *Commissioner of Patents and Trademarks*